Patented Jan. 10, 1939

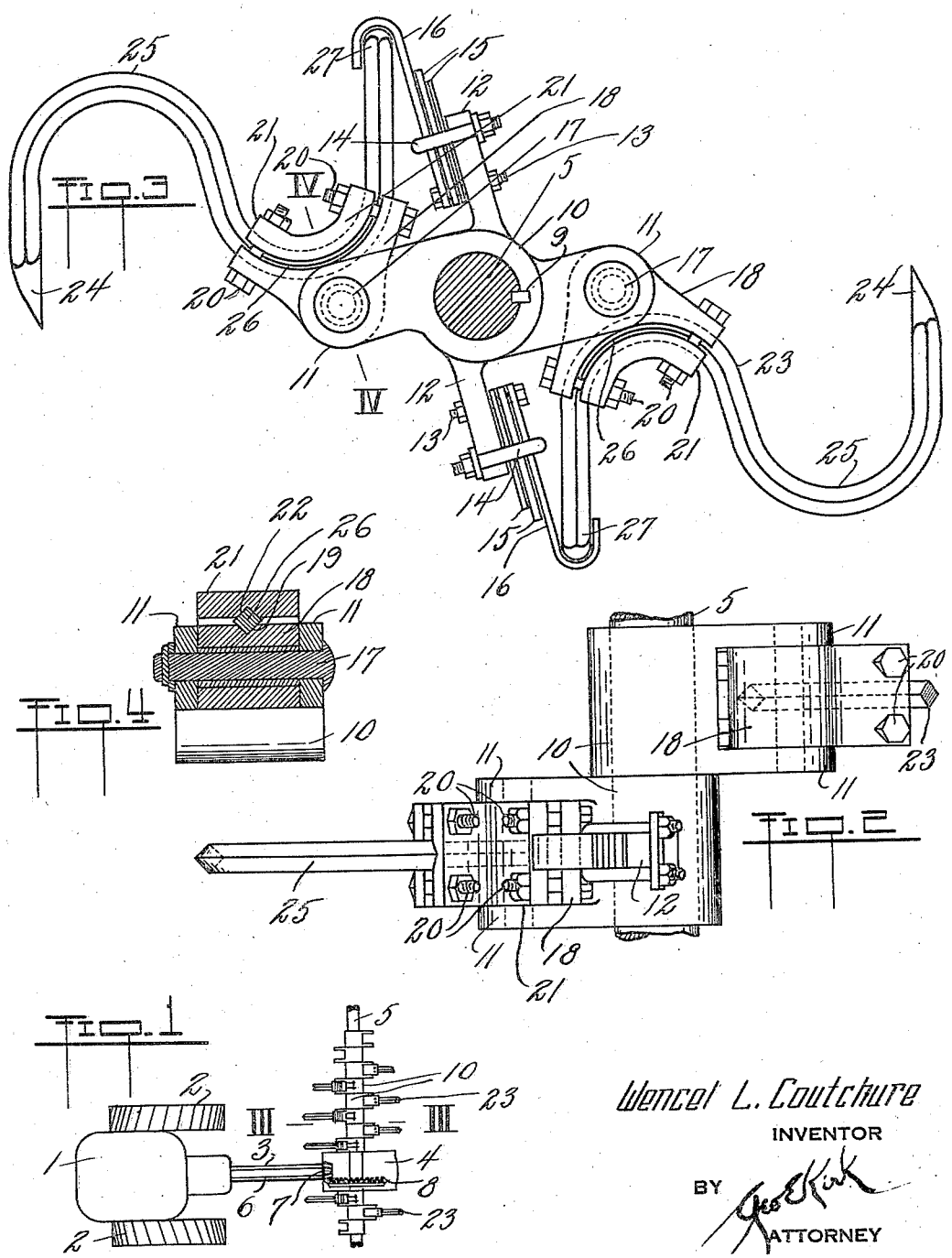

2,143,648

UNITED STATES PATENT OFFICE 2,143,648

LAND CULTIVATION EQUIPMENT

Wencel L. Coutchure, Toledo, Ohio, assignor of one-half to James P. Gilligan, Toledo, Ohio Application January 7, 1938, Serial No. 183,882

4 Claims. (Cl. 97—216)

This invention relates to soil working and loosening.

This invention has utility when incorporated in cultivators involving soil entering, tearing, and throwing members individually independently yieldable.

Referring to the drawing:

Fig. 1 is a plan view of an embodiment of the invention as drawn or propelled by a tractor;

Fig. 2 is an enlarged view in detail of a pair of the units as carried on the transverse trailing or cultivator shaft from the tractor of Fig. 1;

Fig. 3 is a section on the line III—III, Fig. 1, on an enlarged scale, showing a pair of the units; and Fig. 4 is a section on the line IV—IV, Fig. 3.

Propelling means or tractor 1 has ground wheels 2 and draft bar 3 to housing 4 carrying shaft 5. Additionally, from this tractor 1, there is propulsion shaft 6 providing rotation pinion 7 to rotate gear 8 fixed with the shaft 5 for thereby effecting rotation of the tools carried by the shaft 5 at a rate relative to the ground greater than that of the travel of the tractor wheels 2 relatively to the ground.

Key 9 in the shaft 5 anchors hub 10 therewith against relative rotation. This hub 10 is provided with major arm 11 and minor arm 12. This arm 12 carries holding bolt 13 back of U-clamp bolt 14 to another anchor yieldable plates 15 and spring hook 16 adjustably therewith. The arm 11 has therein pivot pin 17 between the ears 11 to carry arc inner clamp member 18 having V-seat 19. This arc clamp member 18 may have assembled therewith by bolts 20 complementary clamp member 21 having opposing seat 22 to register with the seat 19, thereby to permit gripping lock therebetween of spring steel member 23, herein shown as a tine of rectangular cross-section and general S-form, having tapered or pointed soil-engaging free end 24 as a claw to be thrown by rotation of the shaft 5 into soil entering position to tear, in its hooking thereinto, and lift the soil outward at a greater rate of movement than the travel of the tractor. This tine member, as of S-form, has a return bend portion 25 adjacent the claw as a yieldable section; while second return bend portion 26 is held by the clamp 81, 21, but as such clamp is rockable, this rock is limited by engagement of inner terminus 27 at the yieldable hook 16. This means that in the progress of the vehicle, as the rotation of these land care engaging cultivator tools is effective, the whirling of such into the soil may be effective in tearing even tough soil for effectively loosening such for cultivation. If there be, in intercepting, a greater resistance, there is give to take care of such to a measure, and if such be beyond that at which the transmitted power will effect or shear off the key 9, there may be, after the strain of the yieldable hook 16 is past, a giving way of the tine 23 or its hub mounting. This is a sectional unit or minor unit and may readily be replaced for economical upkeep of this device as an efficient item in cultivator equipment.

What is claimed and it is desired to secure by Letter Patent is:

1. A soil working tool embodying a towing vehicle, a transversely extending trailing shaft, ground-engaging arms carried by the shaft, driving means for rotating the shaft at a speed for the arms as to the ground greater than the speed of the shaft as to the ground, means pivoted to said shaft providing a mounting for an arm, said means including a clamp past which the arm protrudes outward for a ground-engaging terminus thereof, there being an opposing terminus, and a yieldable hook engaging the latter terminus.

2. A soil working tool unit embodying a shaft engaging hub, a clamp arm pivotally mounted on the hub, a yieldable hook-carrying arm assembled with the hub, a yieldable S-shaped soil-engaging member having a free end outwardly remote from the hub, an inner intermediate curved portion engaged by the clamp, and an inner terminus adjacent the clamp engaged by the yieldable hook.

3. An S-shaped soil-engaging spring tine member having an outer free end, a rockably clamped return bend remote therefrom, and an inner terminus, and a yieldable hook for restricting rocking of the member.

4. For a land care equipment, a hub having a major arm, a clamp rockably carried thereby, a minor arm, yieldable hook means fixed therewith, and a soil-engaging tine extending both ways from the clamp and having a terminus engaged by the hook.

WENCEL L. COUTCHURE.